United States Patent
Hong et al.

(10) Patent No.: US 9,912,506 B2
(45) Date of Patent: Mar. 6, 2018

(54) METHOD AND APPARATUS FOR ESTIMATING CHANNEL IN WIRELESS COMMUNICATION SYSTEM

(71) Applicant: Samsung Electronics Co., Ltd, Gyeonggi-do (KR)

(72) Inventors: Sung-Nam Hong, Gyeonggi-do (KR); Min Sagong, Gyeonggi-do (KR); Chi-Woo Lim, Gyeonggi-do (KR); Kyung-Whoon Cheun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 62 days.

(21) Appl. No.: 14/905,758

(22) PCT Filed: Jul. 17, 2014

(86) PCT No.: PCT/KR2014/006506
§ 371 (c)(1),
(2) Date: Jan. 15, 2016

(87) PCT Pub. No.: WO2015/009080
PCT Pub. Date: Jan. 22, 2015

(65) Prior Publication Data
US 2016/0173306 A1 Jun. 16, 2016

(30) Foreign Application Priority Data

Jul. 17, 2013 (KR) .................. 10-2013-0084187

(51) Int. Cl.
*H04L 27/26* (2006.01)
*H04B 17/309* (2015.01)
(Continued)

(52) U.S. Cl.
CPC ......... *H04L 27/262* (2013.01); *H04B 17/309* (2015.01); *H04L 25/022* (2013.01);
(Continued)

(58) Field of Classification Search
CPC ............ H04W 72/0406; H04L 27/261; H04L 27/262; H04L 5/0048; H04L 27/0012;
(Continued)

(56) References Cited

U.S. PATENT DOCUMENTS 7,953,143 B2 * 5/2011 Mahadevan ........ H04L 27/2647
375/222
9,071,472 B1 * 6/2015 Reial ..................... H04L 25/067
(Continued)

FOREIGN PATENT DOCUMENTS

| KR | 10-2010-0070283 | 6/2010 |
| KR | 10-2010-0128935 | 12/2010 |

(Continued)

OTHER PUBLICATIONS

Ramesh Annavajjala, Christopher C. Yu, James M. Zagami, "Communication over Non-Gaussian Channels—Part II: Channel Estimation, Mismatched Receivers, and Error Performance with Coding", Military Communications Conference MILCOM 2015—2015 IEEE, Oct. 26-28, 2015 pp. 1132-1137, 2015. http://ieeexplore.ieee.org/document/7357598/.*

(Continued)

*Primary Examiner* — Maharishi Khirodhar
*Assistant Examiner* — Kenneth P Hunt

(57) ABSTRACT

The present invention relates to a method for estimating a channel in a wireless communication system. In the method, a reference value is generated on the basis of a value indicating a non-Gaussian characteristic of an inter-cell interference signal and power values of received pilot symbols, the reference value is compared with each of the power values of the pilot symbols, at least one pilot symbol, which is relatively lightly damaged by the inter-cell interference signal, is selected, and a channel is estimated using the at least one selected pilot symbol.

16 Claims, 6 Drawing Sheets

(51) Int. Cl.
*H04W 72/04* (2009.01)
*H04L 25/02* (2006.01)
*H04L 5/00* (2006.01)
*H04L 27/00* (2006.01)
*H04L 27/14* (2006.01)
*H04L 27/38* (2006.01)

(52) U.S. Cl.
CPC ........ *H04L 25/0224* (2013.01); *H04L 27/261* (2013.01); *H04W 72/0406* (2013.01); *H04L 5/0048* (2013.01); *H04L 27/0012* (2013.01); *H04L 27/14* (2013.01); *H04L 27/38* (2013.01)

(58) Field of Classification Search
CPC ..................... H04L 27/14; H04L 27/38; H04L 25/0202–25/0258; H04B 17/30–17/3913; H04J 11/0023; H04J 11/005; H04J 11/0056; H04J 11/0059
USPC .......................................................... 370/329
See application file for complete search history.

(56) References Cited

U.S. PATENT DOCUMENTS

| | | | |
|---|---|---|---|
| 2002/0164954 A1 | 11/2002 | Jalali | |
| 2004/0198296 A1 | 10/2004 | Hui et al. | |
| 2005/0278609 A1* | 12/2005 | Kim | H03M 13/3723 714/780 |
| 2006/0172716 A1* | 8/2006 | Yoshii | H04L 27/2647 455/226.1 |
| 2006/0227749 A1* | 10/2006 | Zhang | H04B 1/707 370/335 |
| 2007/0036239 A1* | 2/2007 | Ma | H04L 25/0228 375/316 |
| 2009/0103498 A1 | 4/2009 | Nilsson et al. | |
| 2009/0116456 A1 | 5/2009 | Nuutinen et al. | |
| 2010/0002785 A1* | 1/2010 | Mantravadi | H04L 5/0007 375/260 |
| 2010/0150217 A1 | 6/2010 | Jwa et al. | |
| 2010/0303029 A1 | 12/2010 | Jang | |
| 2011/0143773 A1* | 6/2011 | Kangas | G01S 5/02 455/456.1 |
| 2011/0194430 A1* | 8/2011 | Yoo | H04L 25/0224 370/252 |
| 2012/0057480 A1 | 3/2012 | Yoo et al. | |
| 2012/0069753 A1 | 3/2012 | Sankar et al. | |
| 2012/0320775 A1 | 12/2012 | Lee et al. | |
| 2013/0114765 A1* | 5/2013 | Annavajjala | H04L 5/0048 375/341 |
| 2013/0250793 A1* | 9/2013 | Bhattad | H04L 25/0202 370/252 |
| 2014/0177687 A1 | 6/2014 | Seol et al. | |
| 2014/0177756 A1 | 6/2014 | Park et al. | |
| 2014/0211887 A1 | 7/2014 | Sagong et al. | |
| 2014/0269959 A1 | 9/2014 | Lim et al. | |
| 2014/0269992 A1 | 9/2014 | Hong et al. | |
| 2015/0358194 A1 | 12/2015 | Yu et al. | |

FOREIGN PATENT DOCUMENTS

| | | |
|---|---|---|
| KR | 10-2014-0081301 | 7/2014 |
| KR | 10-2014-0081751 | 7/2014 |
| KR | 10-2014-0081753 | 7/2014 |
| KR | 10-2014-0096560 | 8/2014 |
| KR | 10-2014-0111890 | 9/2014 |
| KR | 10-2014-0112898 | 9/2014 |

OTHER PUBLICATIONS

Guan Gui, , Li Xu and Nobuhiro Shimoi "Stable Sparse Channel Estimation Algorithm under Non-Gaussian Noise Environments" 2015 21st Asia-Pacific Conference on Communications (APCC) Oct. 14-16, 2015 pp. 561-565.*
Yi Chen, Shenghao Yang , and Wing Shing Wong "Exact Non-Gaussian Interference Model for Fading Channels" IEEE Transactions on Wireless Communications ( vol. 12, Issue: 1, Jan. 2013 pp. 168-178 http://ieeexplore.ieee.org/document/6373675/.*
International Search Report dated Oct. 27, 2014 in connection with International Patent Application No. PCT/KR2014/006506, 6 pages.
Foreign Communication From a Related Counterpart Application, European Application No. 14825604.3, Partial Supplementary European Search Report dated Feb. 20, 2017, 7 pages.
European Patent Office, "Supplementary European Search Report," Application No. EP 14 82 5604, dated Jun. 16, 2017, 14 pages.

* cited by examiner

METHOD AND APPARATUS FOR ESTIMATING CHANNEL IN WIRELESS COMMUNICATION SYSTEM

CROSS-REFERENCE TO RELATED APPLICATION(S)

The present application claims priority under 35 U.S.C. § 365 to International Patent Application No. PCT/KR2014/006506 filed Jul. 17, 2014, entitled "METHOD AND APPARATUS FOR ESTIMATING CHANNEL IN WIRELESS COMMUNICATION SYSTEM", and, through International Patent Application No. PCT/KR2014/006506, to Korean Application No. 10-2013-0084187 filed Jul. 17, 2013, each of which are incorporated herein by reference into the present disclosure as if fully set forth herein.

DETAILED DESCRIPTION OF THE INVENTION

Technical Field

The present invention relates to a method and apparatus for estimating a channel in a wireless communication system.

Background Art

In a cellular communication system, a 3GPP LTE (3rd Generation Partnership Project Long Term Evolution) standard, an IEEE (Institute of electrical and electronics engineers) 802.16m standard, and the like were designed based on a coherent detection method. The coherent detection method is to estimate distortion in magnitude and phase of a transmission signal passing through a channel at a receiver, to compensate for the transmission signal based on the results of the estimation, and then to perform detection.

In the cellular communication system, channel estimation is positively necessary, and channel estimation errors greatly influence system performance. For this reason, most of cellular communication system standards defines transmission standards for pilot symbols, which are used for channel estimation.

An Inter-Cell Interference (ICI) signal that is generated in the cellular communication system may damage pilot symbols, which may lead to deterioration of system performance. In the 3 GPP LTE standard, in order to prevent system performance from deteriorating due to damage of pilot symbols, the positions of pilot symbols are set differently between a base station of a serving cell and base stations of the adjacent cells, and power of the pilot symbols is boosted according to predetermined criteria. As a result, the major part of an ICI signal that greatly influences pilot symbols becomes data symbols, and the magnitude of the ICI signal becomes smaller than the magnitude of the pilot symbol due to the boosting effect.

However, despite the effect, when a user is located at a cell boundary, channel estimation performance greatly deteriorates since the intensities of interference signals become very strong due to the adjacent cells, which also greatly deteriorates system performance. Particularly, in the case of system using a Quadrature Amplitude Modulation (QAM) method, since all data symbols are activated, collision between data symbols and pilot symbols often occurs, which makes improvement of channel estimation performance very difficult.

Recently, studies into a modulation method for making an interference signal have a non-Gaussian characteristic based on the greater channel capacities of non-Gaussian channels than Gaussian channels are actively conducted. However, if an interference signal has a non-Gaussian characteristic, there coexist pilot symbols significantly damaged by the interference signal and pilot symbols little damaged by the interference signal, which leads to deterioration of channel estimation performance as a result. Accordingly, a channel estimation method for ensuring satisfactory performance in a non-Gaussian interference environment is needed.

DISCLOSURE

Technical Problem

An embodiment of the present disclosure proposes a channel estimation method and apparatus that are suitable for a non-Gaussian interference environment in a wireless communication system.

Also, another embodiment of the present disclosure proposes a method and apparatus for estimating a channel based on pilot symbols relatively lightly damaged in a wireless communication system.

Also, still another embodiment of the present disclosure proposes a method of adaptively estimating a channel through cooperation between a base station and a terminal.

Technical Solution

In accordance with an aspect of exemplary embodiments of the present disclosure, there is provided a method of estimating a channel in a wireless communication system including: generating a reference value based on a value indicating a non-Gaussian characteristic of an inter-cell interference signal and power values of received pilot symbols; comparing the reference value to each of the power values of the pilot symbols to select at least one pilot symbol relatively lightly damaged by the inter-cell interference signal from among the pilot symbols; and estimating a channel using the at least one selected pilot symbol.

In accordance with another aspect of exemplary embodiments of the present disclosure, there is provided a method in which a base station provides an optimal channel estimation method to a terminal in a wireless communication system, including: receiving information about a first channel estimation mode for estimating a channel using a plurality of pilot symbols, or information about a second channel estimation mode for estimating a channel using at least one pilot symbol selected from among the plurality of pilot symbols, from the terminal; and deciding a final channel estimation mode suitable for the terminal in consideration of the information about the first channel estimation mode or the information about the second channel estimation mode, and transmitting information about the final channel estimation mode to the terminal.

In accordance with another aspect of exemplary embodiments of the present disclosure, there is provided a method in which a terminal receives an optimal channel estimation method from a base station in a wireless communication system, including: transmitting information about a first channel estimation mode for estimating a channel using a plurality of pilot symbols, or information about a second channel estimation mode for estimating a channel using at least one pilot symbol selected from among the plurality of pilot symbols, to the base station; and receiving information about a final channel estimation mode decided in consideration of the information about the first channel estimation mode or the information about the second channel estimation mode, from the base station.

In accordance with another aspect of exemplary embodiments of the present disclosure, there is provided an apparatus of estimating a channel in a wireless communication system including: a communication unit configured to receive pilot symbols; a pilot symbol selector configured to generate a reference value based on a value indicating a non-Gaussian characteristic of an inter-cell interference signal and power values of the received pilot symbols, to compare the reference value to each of the power values of the pilot symbols to select at least one pilot symbol relatively lightly damaged by the inter-cell interference signal from among the pilot symbols; and a channel estimator configured to estimate a channel using the at least one selected pilot symbol.

In accordance with another aspect of exemplary embodiments of the present disclosure, there is provided a base station of providing an optimal channel estimation method to a terminal in a wireless communication system, including: a receiver configured to receive information about a first channel estimation mode for estimating a channel using a plurality of pilot symbols, or information about a second channel estimation mode for estimating a channel using at least one pilot symbol selected from among the plurality of pilot symbols, from the terminal; and a control module configured to decide a final channel estimation mode for the terminal, in consideration of the information about the first channel estimation mode or the information about the second channel estimation mode, received from the base station; and a transmitter configured to transmit information about the final channel estimation mode to the terminal.

In accordance with another aspect of exemplary embodiments of the present disclosure, there is provided a terminal of receiving an optimal channel estimation method from a base station in a wireless communication system, including: a transmitter configured to transmit information about a first channel estimation mode for estimating a channel using a plurality of pilot symbols, or information about a second channel estimation mode for estimating a channel using at least one pilot symbol selected from among the plurality of pilot symbols, to the base station; and a receiver configured to receive information about a final channel estimation mode decided in consideration of the information about the first channel estimation mode or the information about the second channel estimation mode, from the base station.

Advantageous Effects

According to the present disclosure, by performing channel estimation based on pilot symbols relatively lightly damaged among received pilot symbols in a non-Gaussian interference environment, it is possible to improve channel estimation performance.

BEST MODE

Reference will now be made in detail to the embodiments of the present disclosure, examples of which are illustrated in the accompanying drawings. In the following description, if it is determined that detailed descriptions for related, well-known functions or configurations make the subject matter of the present disclosure obscure unnecessarily, the detailed descriptions will be omitted. Also, although terms used in the present disclosure were selected as terminology used in the present disclosure while considering the functions in the present disclosure, they may vary according to a user's or operator's intentions, judicial precedents, and the like. Hence, the terms must be defined based on the contents of the entire specification, not by simply stating the terms themselves.

In the embodiments of the present disclosure which will be described below, a channel estimation method and apparatus for reflecting a non-Gaussian characteristic of an inter-cell interference signal in a communication system that uses Hybrid FSK and QAM (FQAM) modulation operated based on Quadrature Amplitude Modulation (QAM) and Frequency Shift Keying (FSK), FSK modulation, and Multi-Tone FQAM (MT-FQAM) modulation are suggested.

Figure 1:
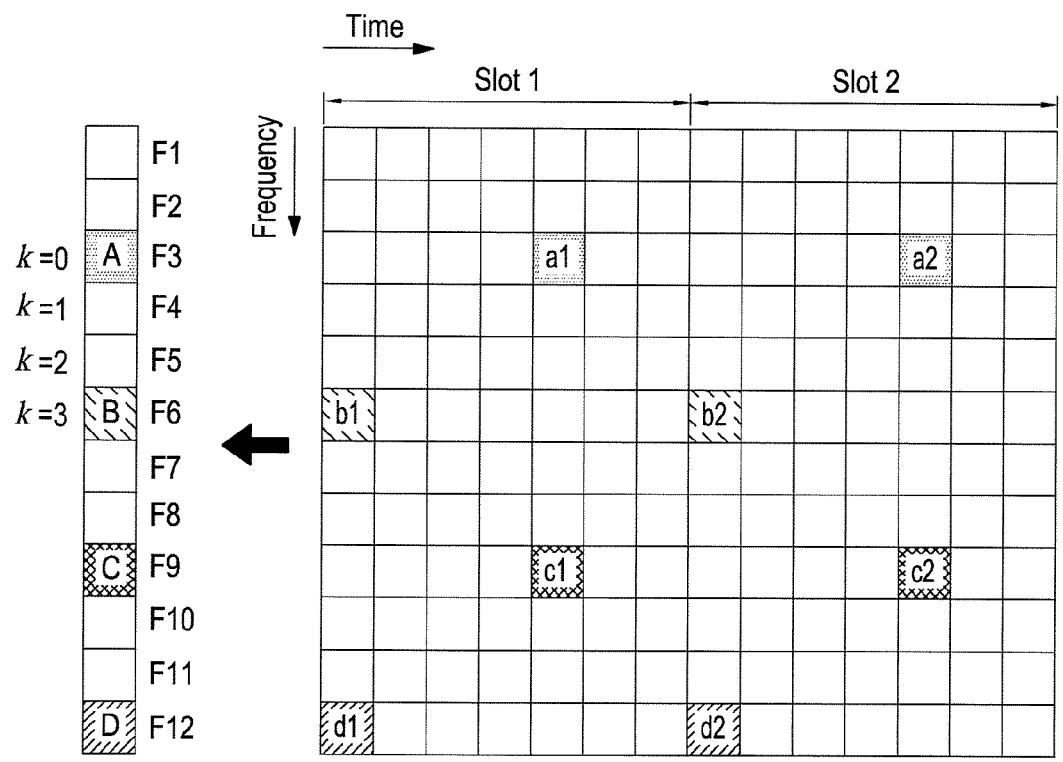
FIG. 1 shows an example of channel estimation in a general communication system.

In this specification, the term "pilot symbol" is used as the same meaning as a "reference signal" or a "reference symbol". Also, in this specification, the term "terminal" may be also indicated as user equipment (UE), and the "UE" may indicate, for example, a mobile station, an advanced mobile station, a wireless terminal communication apparatus, a Machine to Machine (M2M) apparatus, or a Machine Type Communications (MTC) apparatus. Also, the "UE" may be, for example, a server, a client, a desktop computer, a laptop computer, a network computer, a workstation, a personal digital assistant (PDA), a tablet Personal Computer (PC), a scanner, a telephone, a pager, a camera, a television, portable video games, a music player, a media player, or a wireless sensor. In some applications, the "UE" may be a fixed computing device that operates in a mobile environment, such as a bus, a train, a plane, a boat, a vehicle, and the like. A base station (BS) may be Node B, eNode B (evolved Node B), a base transceiver system (BTS), a remote head device, Access Point (AP), a home base station, a Femto-cell base station, a relay station, a scatterer, a repeater, an intermediate node, and/or a satellite-based communication base station. FIG. 1 shows an example of channel estimation in a general communication system.

Referring to FIG. 1, resource blocks (RBs) may include a first slot Slot1 and a second slot Slot2 that are divided on the time axis. In the 3rd Generation Partnership Project Long Term Evolution (3GPP LTE) standard that defines 10 subframes as one frame, two RBs may be referred to as a sub frame or a resource block pair.

A RB is a basic unit for allocating a resource, and may be defined by the frequency axis and the time axis. For example, a RB may include 7 symbol areas on the time axis, and 12 subcarriers on the frequency axis. A symbol area and a subcarrier corresponding to the symbol area may be indicated as a Resource Element (RE). Accordingly, a RB may include 84 REs arranged in a matrix form.

A general channel estimation process may be greatly divided into a channel estimation process for pilot symbols and a channel estimation process for data symbols.

The channel estimation process for pilot symbols is as follows. 12 frequency indexes F1, F2, . . . , F12 may be assigned to 12 subcarriers, respectively, under the assumption that a channel for a given frequency index does not change on the time axis.

Channel values of received pilot symbols may be accumulated for each frequency index, and the accumulated channel values may be used to estimate a channel for the pilot symbols. That is, when a channel for pilot symbols a1 and a2 inserted (or distributed) in the direction of the time axis for the frequency index F3 is estimated, a channel value estimated from the received pilot symbol a1 may be added to a channel value estimated from the received pilot symbol a2 in a RB corresponding to the second slot Slot2, and the result of the addition may be divided by 2, so that a final channel estimation value A for the frequency index F3 can be calculated. The final channel estimation value A may be expressed as Equation (1), below.

$$A = \frac{1}{2}\left(\frac{a1 p_{a1}^*}{|p_{a1}|^2} + \frac{a2 p_{a2}^*}{|p_{a2}|^2}\right) \quad (1)$$

Channel estimation values for the frequency indexes F6, F9, and F12 may also be calculated by the similar method.

The channel estimation process for data symbols is as follows. A channel for data symbols may be estimated using channel estimation values acquired in the channel estimation process for pilot symbols. That is, a channel estimation value for data symbols in the frequency index F4 may be calculated using the channel estimation value A calculated from the pilot symbols distributed in the frequency index F3 and a channel estimation value B calculated from pilot symbols distributed in the frequency index F6. At this time, a linear interpolation method may be used which can be expressed as Equation (2) below.

$$F4 = \frac{B-A}{3-0}(k) + A, \quad k = 1 \quad (2)$$

A channel estimation value for data symbols in the frequency index F5 can be expressed as Equation (3), below.

$$F5 = \frac{B-A}{3-0}(k) + A, \quad k = 2 \quad (3)$$

Channel estimation values for the remaining data symbols may also be calculated by the similar method.

The general channel estimation process as described above does not consider degrees of damage of pilot symbols since all pilot symbols are used. In the case of QAM-based system, all data subcarriers in a resource area are activated so that most of pilot symbols collide with the data subcarriers. Accordingly, all the pilot symbols may be influenced by interference signals of similar magnitudes so as to be damaged at similar degrees. For this reason, in the QAM-based system, it makes sense to use as many pilot symbols as possible for channel estimation to compensate damage of pilot symbols.

However, in a FQAM modulation method, a FSK modulation method, a MT-FQAM modulation method, and the like, data subcarriers constituting a data symbol is partially activated. Accordingly, when any one of the above-mentioned modulation methods is applied to a wireless communication system, inter-cell interference having a non-Gaussian characteristic may occur, and thus, pilot symbols may be damaged at different degrees by the inter-cell interference. That is, a part of pilot symbols may be greatly damaged by an inter-cell interference signal having a non-Gaussian characteristic, whereas the other part may be little influenced by the inter-cell interference signal so as to be lightly damaged. Therefore, in system (or a non-Gaussian interference environment) based on the FQAM modulation method, the FSK modulation method, the MT-FQAM modulation method, or the like, it is inefficient to estimate a channel using all pilot symbols without considering degrees of damage of the pilot symbols, which may lead to performance deterioration.

Figure 2:
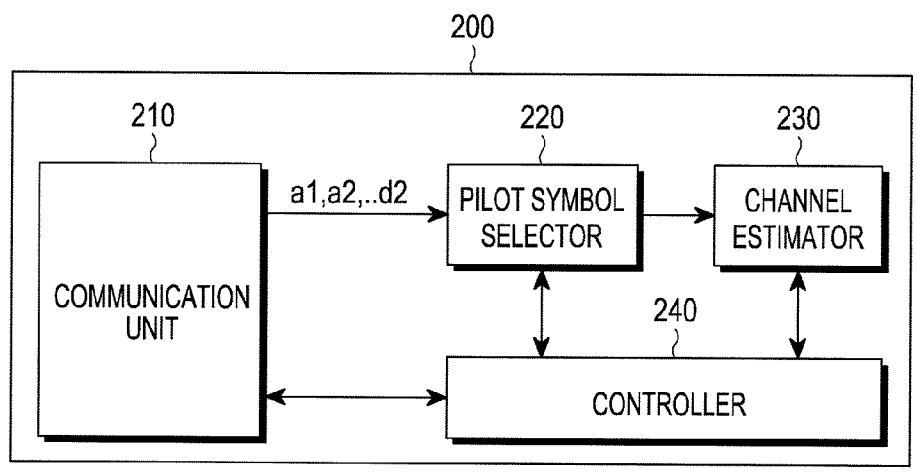
FIG. 2 is a block diagram showing an example of an internal configuration of a channel estimation apparatus for estimating a channel in a communication system according to an embodiment of the present disclosure.

In order to prevent such performance deterioration, a method of selecting pilot symbols lightly damaged among all pilot symbols in a non-Gaussian interference environment and a method of estimating a channel using the selected pilot symbols are proposed, which will be described in detail below. FIG. 2 is a block diagram showing an example of an internal configuration of a channel estimation apparatus for estimating a channel in a communication system according to an embodiment of the present disclosure. For convenience of description, it is assumed that the channel estimation apparatus is included in a terminal in a wireless communication environment configured with the terminal and a base station.

Referring to FIG. 2, a channel estimation apparatus 200 may include a communication unit 210, a pilot symbol selector 220, a channel estimator 230, and a controller 240. The channel estimation apparatus 200 may select pilot symbols that are lightly damaged in a non-Gaussian interference environment, and estimate a channel using the selected pilot symbols. The channel estimation apparatus 200 may be, for convenience of description, divided into four configuration blocks, however, the channel estimation apparatus 200 is not limited to the four configuration blocks. For example, the functions of the pilot symbol selector 220 and the channel estimator 230 may be implemented in the form of an algorithm, and the algorithm may be installed in the controller 240.

The communication unit 210 may receive a plurality of data symbols modulated according to the FQAM modulation method, the FSK modulation, the MT-FQAM modulation method or the like (hereinafter, collectively referred to as a "FQAM-based modulation method"), and a plurality of pilot symbols modulated according to the QAM modulation method, and demodulate the received data symbols and pilot symbols. The communication unit 210 may include a modem. The general functions and hardware configuration of the modem are well-known in the art, and accordingly, detailed descriptions thereof will be omitted. The modem included in the communication unit 210 may include a first modulation/demodulation module to demodulate a plurality of data symbols modulated according to the FQAM-based modulation method, and a second modulation/demodulation module to demodulate a plurality of pilot symbols modulated according to the QAM modulation method, in order to support different modulation methods. However, the first and second modulation/demodulation modules may be integrated into a single module.

The pilot symbol selector 220 may select pilot symbols not damaged by an inter-cell interference signal of a non-Gaussian characteristic, that is, valid pilot symbols from among the received pilot symbols. More specifically, the pilot symbol selector 220 may generate a reference value $P_{TH}$ using a parameter $N_P$ related to a non-Gaussian characteristic of an inter-cell interference signal, and compare each of power values of the plurality of received pilot symbols to the reference value $P_{TH}$ to thus select valid pilot symbols not damaged by the inter-cell interference signal. Various embodiments related to this operation will be described in detail, later.

The channel estimator 230 may estimate a channel using the valid pilot symbols selected by the pilot symbol selector 220. At this time, the channel estimator 230 may check the number of the valid pilot symbols, and perform a predetermined channel estimation process according to the checked number of the valid pilot symbols. This operation will be also described in detail, later.

The controller 230 may manage and control overall operations of the communication unit 210, the pilot symbol selector 220, and the channel estimator 230.

Hereinafter, first, second, and third embodiments based on the operation of the pilot symbol selector 220 shown in FIG. 2 will be described. The first, second, and third embodiments are different in view of a process for generating a reference value that is used by the pilot symbol selector 220 to select pilot symbols.

Figure 3:
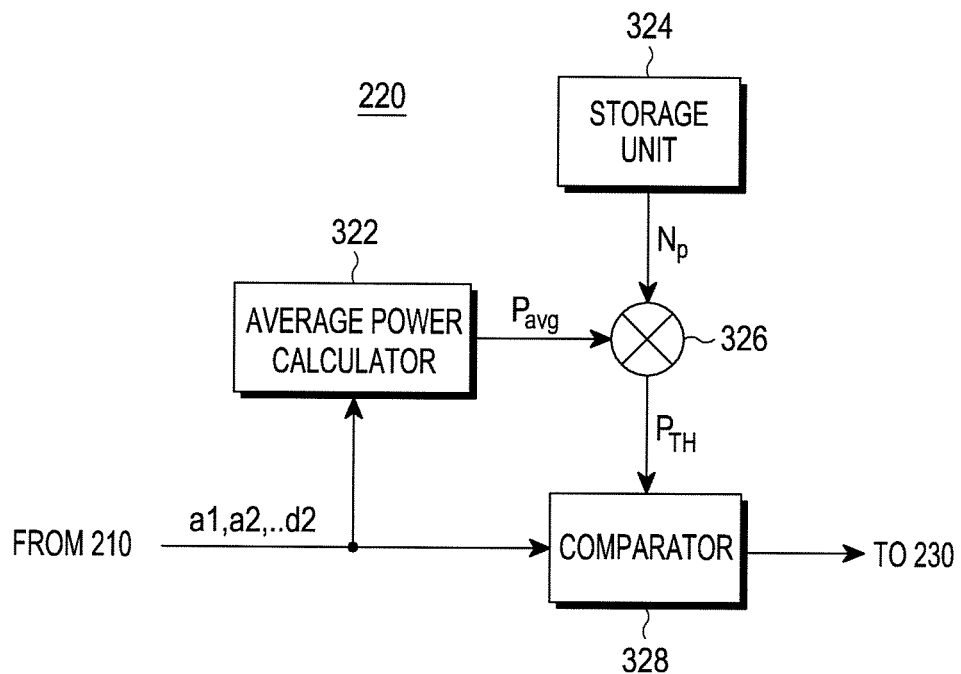
FIG. 3 is a block diagram showing an example of an internal configuration of a pilot symbol selector in a communication system according to an embodiment of the present disclosure.

FIG. 3 is a block diagram showing an example of an internal configuration of the pilot symbol selector 220 in the communication system according to an embodiment of the present disclosure.

Referring to FIG. 3, the pilot symbol selector 220 according to a first embodiment of the present disclosure may select valid pilot symbols based on $N_P$ times of average power of received pilot symbols. In order to select valid pilot symbols based on $N_P$ times of average power of received pilot symbols, the pilot symbol selector 220 according to the first embodiment of the present disclosure may include an average power calculator 322, a storage unit 324, a reference value generator 326, and a comparator 328.

The average power calculator 322 may calculate average power $P_{avg}$ of the received pilot symbols. For easy understanding of description, in the current embodiment, it is assumed that average power $P_{avg}$ for power intensity is calculated in units of two RBs, as shown in FIG. 1. In the example of FIG. 1, average power $P_{avg}$ of eight received pilot symbols a1, a2, b1, b2, c1, c2, d1, and d2 may be calculated. The average power $P_{avg}$ may be expressed as Equation (4), below, wherein $|a1|^2$ represents a power value of the received pilot symbol a1, and $|a2|^2$ and $|d2|^2$ represent power values of the corresponding received pilot symbols a2 and d2, respectively.

$$P_{avg} = \frac{1}{8}(|a1|^2 + |a2|^2 + EEE|d2|^2) \quad (4)$$

The storage unit 324 may store the parameter $N_P$ that is used by the reference value generator 326 to generate the reference value $N_P$. The parameter $N_P$ may be set to various values based on the results of estimation on the non-Gaussian characteristic of the inter-cell interference signal. The probability of collision between an inter-cell interference signal and pilot symbols may be predicted from the estimated non-Gaussian characteristic, and the parameter $N_P$ may be set to various values according to the probability of collision predicted from the estimated non-Gaussian characteristic. This will be described in more detail, later.

The reference value generator 326 may generate the reference value $P_{TH}$ by multiplying the average power $P_{avg}$ output from the average power calculator 322 by the parameter $N_P$ stored in the storage unit 324. As such, the reference value generator 326 may generate the reference value $P_{TH}$ through multiplication operation between the average power $P_{avg}$ and the parameter $N_P$, and in this case, the reference value generator 326 may be implemented as a multiplier. The reference value $P_{TH}$ can be expressed as Equation (5), below.

$$P_{TH} = N_P E P_{avg} \quad (5)$$

The comparator 328 may compare the power values of the received pilot symbols a1, a2, b1, b2, c1, c2, d1, and d2 to the reference value $P_{TH}$ to select valid pilot symbols based on the results of the comparison. For example, if the comparator 328 determines that the power value of a pilot symbol is greater than the reference value $P_{TH}$, the comparator 328 may determine that the pilot symbol was significantly damaged, and may not select the pilot symbol as a valid pilot symbol. However, if the comparator 328 determines that the power value of a pilot symbol is equal to or smaller than the reference value $P_{TH}$, the comparator 328 may select the pilot symbol as a valid pilot symbol.

The selected valid pilot symbols may be transferred to the channel estimator 230, and the channel estimator 230 may estimate a channel using the selected valid pilot symbols.

Figure 4:
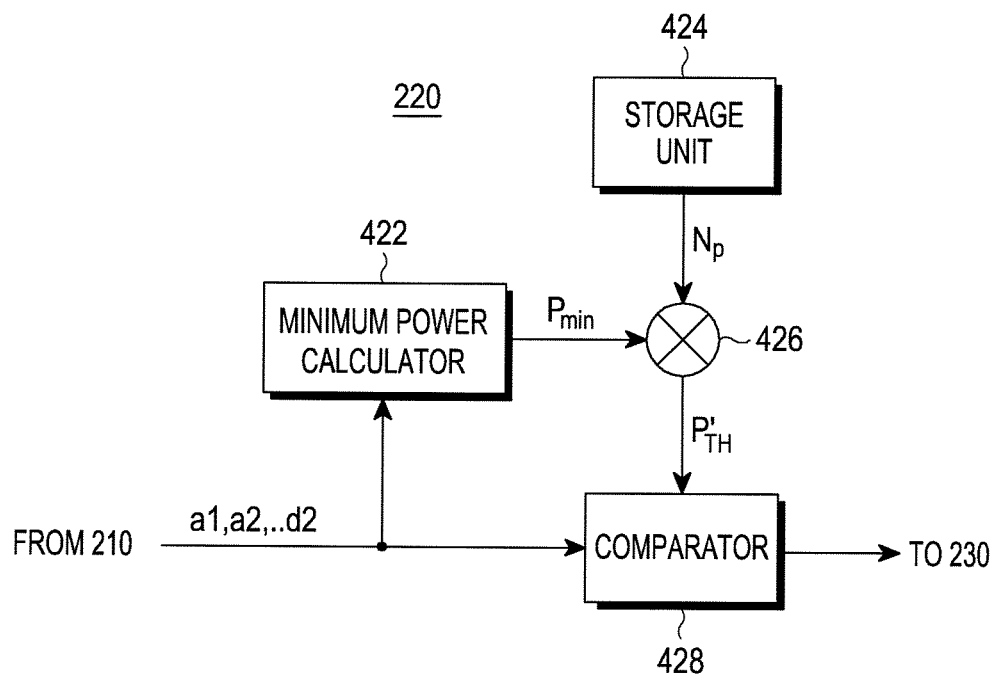
FIG. 4 is a block diagram showing another example of an internal configuration of a pilot symbol selector in a communication system according to an embodiment of the present disclosure.

FIG. 4 is a block diagram showing another example of an internal configuration of the pilot symbol selector 220 in the communication system according to an embodiment of the present disclosure.

Referring to FIG. 4, the pilot symbol selector 220 according to a second embodiment of the present disclosure may select valid pilot symbols based on $N_P$ times of minimum power of received pilot symbols. In order to select valid pilot symbols based on $N_P$ times of minimum power of received pilot symbols, the pilot symbol selector 220 according to the second embodiment of the present disclosure may include a minimum power calculator 422, a storage unit 424, a reference value generator 426, and a comparator 428.

The remaining components 424, 426, and 428 except for the minimum power calculator 422 may respectively perform the same functions as the components 324, 326, and 328 shown in FIG. 3. Accordingly, the functions of the components 424, 426, and 428 will be able to be understood with reference to the above descriptions about the components 324, 326, and 328 of FIG. 3.

The minimum power calculator 422 may select a minimum power value $P_{min}$ which is a minimum value of power values of received pilot symbols. The minimum power value $P_{min}$ may be expressed as Equation (6), below, wherein $|a1|^2$ represents a power value of a received pilot symbol a1, and $|a2|^2$ and $|d2|^2$ represent power values of the corresponding received pilot symbols a2 and d2, respectively.

$$P_{min} = \min(|a1|^2, |a2|^2, \ldots, |d2|^2) \qquad (6)$$

Accordingly, a reference value $P_{TH'}$ that is used to select valid pilot symbols may be calculated by Equation (7), below.

$$P_{TH'} = N_P E P_{min} \qquad (7)$$

The comparator 428 may compare the power values of the received pilot symbols a1, a2, b1, b2, c1, c2, d1, and d2 to the reference value $P_{TH'}$, and select valid pilot symbols based on the results of the comparison. For example, if the comparator 428 determines that the power value of a pilot symbol is greater than the reference value $P_{TH'}$, the comparator 428 may determine that the pilot symbol was significantly damaged, and may not select the pilot symbol as a valid pilot symbol. However, if the comparator 428 determines that the power value of a pilot symbol is equal to or smaller than the reference value $P_{TH'}$, the comparator 428 may select the pilot symbol as a valid pilot symbol.

The selected valid pilot symbols may be transferred to the channel estimator 230, and the channel estimator 230 may estimate a channel using the selected valid pilot symbols.

Figure 5:
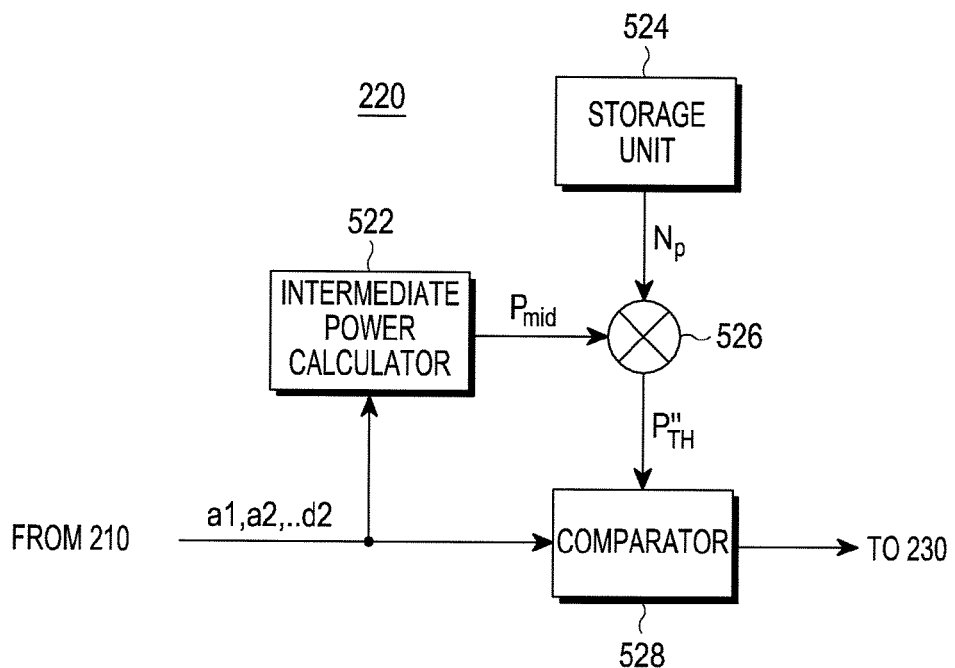
FIG. 5 is a block diagram showing still another example of an internal configuration of a pilot symbol selector in a communication system according to an embodiment of the present disclosure.

FIG. 5 is a block diagram showing still another example of an internal configuration of the pilot symbol selector 220 in the communication system according to an embodiment of the present disclosure.

Referring to FIG. 5, the pilot symbol selector 220 according to a third embodiment of the present disclosure may select valid pilot symbols based on $N_P$ times of a difference between maximum power and minimum power of received pilot symbols. In order to select valid pilot symbols based on $N_P$ times of a difference between maximum power and minimum power of received pilot symbols, the pilot symbol selector 220 according to the third embodiment of the present disclosure may include an intermediate power calculator 522, a storage unit 524, a reference value generator 526, and a comparator 528.

The remaining components 524, 526, and 528 except for the intermediate power calculator 522 may respectively perform the same functions as the components 324, 326, and 328 shown in FIG. 3. Accordingly, the functions of the components 524, 526, and 528 will be able to be understood with reference to the above descriptions about the components 324, 326, and 328 of FIG. 3.

The intermediate power calculator 522 may select a minimum power value $P_{min}$ and a maximum power value $P_{max}$ which are a minimum value and a maximum value of the power values of the received pilot symbols. The minimum power value $P_{min}$ and the maximum power value $P_{max}$ may be respectively expressed as Equations (8) and (9), below, wherein $|a1|^2$ represents a power value of a received pilot symbol a1, and $|a2|^2$ and $|d2|^2$ represent power values of the corresponding received pilot symbols a2 and d2, respectively.

$$P_{min} = \min(|a1|^2, |a2|^2, \ldots, |d2|^2) \qquad (8)$$

$$P_{max} = \max(|a1|^2, |a2|^2, \ldots, |d2|^2) \qquad (9)$$

Then, the intermediate power calculator 522 may calculate a difference between the minimum power value $P_{min}$ and the maximum power value $P_{max}$, and calculate a reference value $P_{TH''}$ that is used to select valid pilot symbols, using Equation (10), as follows.

$$P_{TH''} = N_P (P_{max} - P_{min}) \qquad (10)$$

The comparator 528 may compare the power values of the received pilot symbols a1, a2, b1, b2, c1, c2, d1, and d2 to the reference value $P_{TH''}$, and select valid pilot symbols based on the results of the comparison. For example, if the comparator 528 determines that the power value of a pilot symbol is greater than the reference value $P_{TH''}$, the comparator 528 may determine that the pilot symbol was significantly damaged, and may not select the pilot symbol as a valid pilot symbol. However, if the comparator 528 determines that the power value of a pilot symbol is equal to or smaller than the reference value $P_{TH''}$, the comparator 528 may select the pilot symbol as a valid pilot symbol.

The selected valid pilot symbols may be transferred to the channel estimator 230, and the channel estimator 230 may estimate a channel using the selected valid pilot symbols.

Hereinafter, the parameter $N_P$ that is used by the pilot symbol selector 220 according to the first, second, and third embodiments of the present disclosure to generate the reference value $P_{TH}$, $P_{TH'}$, or $P_{TH''}$ will be described.

A factor that crucially influences in setting the parameter $N_P$ may be the probability that pilot symbols will be significantly damaged. Herein, the probability that pilot symbols will be significantly damaged can be understood as the probability of collision between received pilot symbols and an inter-cell interference signal. The probability of collision between received pilot signals and an inter-cell interference signal may be predicted based on a parameter such as the number (FSK order) of subcarriers constructing a FQAM symbol and a non-Gaussian characteristic of the inter-cell interference signal. Accordingly, the parameter $N_P$ may need to be appropriately adjusted according to the FSK order, the non-Gaussian characteristic of the inter-cell interference signal, or frequency selectivity.

For example, if the non-Gaussian characteristic of the inter-cell interference signal is very extreme, it is preferable to determine validity of received pilot symbols according to the embodiment of FIG. 4 or 5. In this case, if the probability of collision between the received pilot symbols and the inter-cell interference signal is very low, the parameter $N_P$ may be preferably set to a value that is greater than 1, in consideration of performance. In contrast, if the probability of collision between the received pilot symbols and the inter-cell interference signal is very high, the parameter $N_P$ may be preferably set to a value that is smaller than 1, in consideration of performance.

Also, if the non-Gaussian characteristic of the inter-cell interference signal is not very extreme, it is preferable to determine validity of received pilot symbols according to the embodiment of FIG. 3. In this case, the parameter $N_P$ may be preferably set to an intermediate value between a parameter $N_P$ set when the probability of collision between the received pilot symbols and the inter-cell interference signal is very high and a parameter $N_P$ set when the probability of collision between the received pilot symbols and the inter-cell interference signal is very low. For example, the parameter $N_P$ may be set to 1.

The power values of the received pilot symbols may vary depending on channel frequency selectivity. When channel frequency selectivity is very great or small, the method of selecting valid pilot symbols according to the second embodiment of FIG. 4 may cause performance deterioration. Accordingly, when channel frequency selectivity is very great or small, the parameter $N_P$ may need to be more or less adjusted. For example, when channel frequency selectivity is very great, the parameter $N_P$ may be preferably set to be greater than 3, in consideration of performance. In contrast, when channel frequency selectivity is very small, the parameter $N_P$ may be preferably set to be greater than 1 and smaller than 3, in consideration of performance.

The method of selecting valid pilot symbols according to the third embodiment of FIG. 5 may be suggested for a similar purpose as the second embodiment of FIG. 4. In the third embodiment of FIG. 5, since the reference value $P_{TH''}$ is calculated based on the difference value between the maximum power value $P_{max}$ and the minimum power value $P_{min}$, the parameter $N_P$ may be set to ½.

Figure 6:
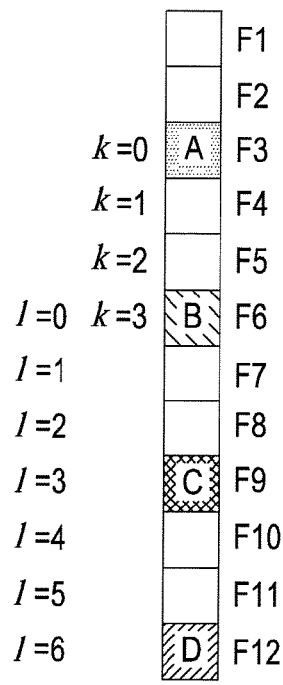
FIG. 6 is a view for describing an example of estimating a channel using valid pilot symbols selected by a pilot symbol selector in a communication system according to an embodiment of the present disclosure.

FIG. 6 is a view for describing an example of estimating a channel using valid pilot symbols selected by the pilot symbol selector 220 in the communication system according to an embodiment of the present disclosure.

Referring to FIG. 6, it is assumed that a channel estimation process, which is performed by the channel estimator 230, is performed using valid pilot symbols selected according to any one of the embodiments of FIGS. 3 to 5.

The channel estimator 230 may receive valid pilot symbols from the pilot symbol selector 220, and check the number of the received valid pilot symbols.

If the channel estimator 230 determines that the number of the valid pilot symbols is 2 or more on the time axis, the channel estimator 230 may accumulate channel values of the valid pilot symbols, and estimate a channel for the pilot symbols using the accumulated channel value, as seen in Equation (1).

Meanwhile, if the channel estimator 230 determines that the number of the valid pilot symbols is 1 on the time axis, the channel estimator 230 may estimate a channel using the valid pilot symbol. For example, if one of the received pilot symbols a1 and a2 distributed in the frequency index F3 is selected as a valid pilot symbol, a channel estimation value A may be calculated according to Equation (11), below.

$$A = \frac{a1 P_{a1}^*}{|P_{a1}|^2} \quad (11)$$

or $$\frac{a2 P_{a2}^*}{|P_{a2}|^2}$$

If the channel estimator 230 determines that the number of the valid pilot symbols is zero on the time axis, the channel estimator 230 may perform no channel estimation for the corresponding frequency index, and perform channel estimation for the other frequency indexes.

The channel estimation process for data symbols may be as follows.

First, if the channel estimator 230 determines that the number of valid pilot symbols in a resource area is zero, the channel estimator 230 may increase a reference value $P_{TH}$ for determining validity of received pilot symbols by one level, and then again perform a process of selecting valid pilot symbols for the received pilot symbols based on the increased reference value $wP_{TH}$. The increased reference value $wP_{TH}$ may be expressed as Equation (12), below.

$$wP_{TH} = \rho P_{TH}, \quad (12)$$

where $\rho$ represents a weight value.

The $\rho$ value is a value weighted for each level, and may be set to increase the reference value $P_{TH}$ by 10%. For example, when the reference value $P_{TH}$ is 1 and the channel estimator 230 increases the reference value 1 by one level, the $\rho$ value may be set to 1.1. Also, when the channel estimator 230 increases the reference value 1 by two levels, the $\rho$ value may be set to 1.2.

If a channel estimation value of pilot symbols for one of the frequency indexes F3, F6, F9, and F12 is acquired, a channel estimation value for all data symbols may be estimated as the channel estimation value calculated in the corresponding frequency index. For example, if a channel estimation value B for the frequency index F6 is acquired, a channel estimation value for all data symbols may be estimated as B.

If channel estimation values of pilot symbols for two or more of the frequency indexes F3, F6, F9, and F12 are acquired, channel estimation values for data symbols may be estimated using the channel estimation values. For example, referring to FIG. 6, if channel estimation values for the frequency indexes F3, F6, and F12 are acquired, a channel estimation value for data symbols for each of the frequency indexes F3, F6, and F12 may be calculated according to Equation (13), below. In Equation 13, F4, F5, F7, F8, F9, F10, and F11 may be calculated using a linear interpolation method. In Equation 13, A represents a channel estimation value calculated from pilot symbols distributed in the frequency index F3, B represents a channel estimation value calculated from pilot symbols distributed in the frequency index F6, and D represents a channel estimation value calculated from pilot symbols distributed in the frequency index F12.

$$F1 = F2 = F3 = A \quad (13)$$

$$F4 = \frac{B-A}{3-0}(K) + A,$$

$$k = 1$$

$$F5 = \frac{B-A}{3-0}(K) + A,$$

$$k = 2$$

$$F6 = B$$

$$F7 = \frac{D-B}{6-0}(l) + B,$$

$$l = 1$$

$$F8 = \frac{D-B}{6-0}(l) + B,$$

$$l = 2$$

$$F9 = \frac{D-B}{6-0}(l) + B,$$

$$l = 3$$

$$F10 = \frac{D-B}{6-0}(l) + B,$$

$$l = 3$$

$$F11 = \frac{D-B}{6-0}(l) + B,$$

$$l = 3$$

$$F12 = D$$

Figure 7:
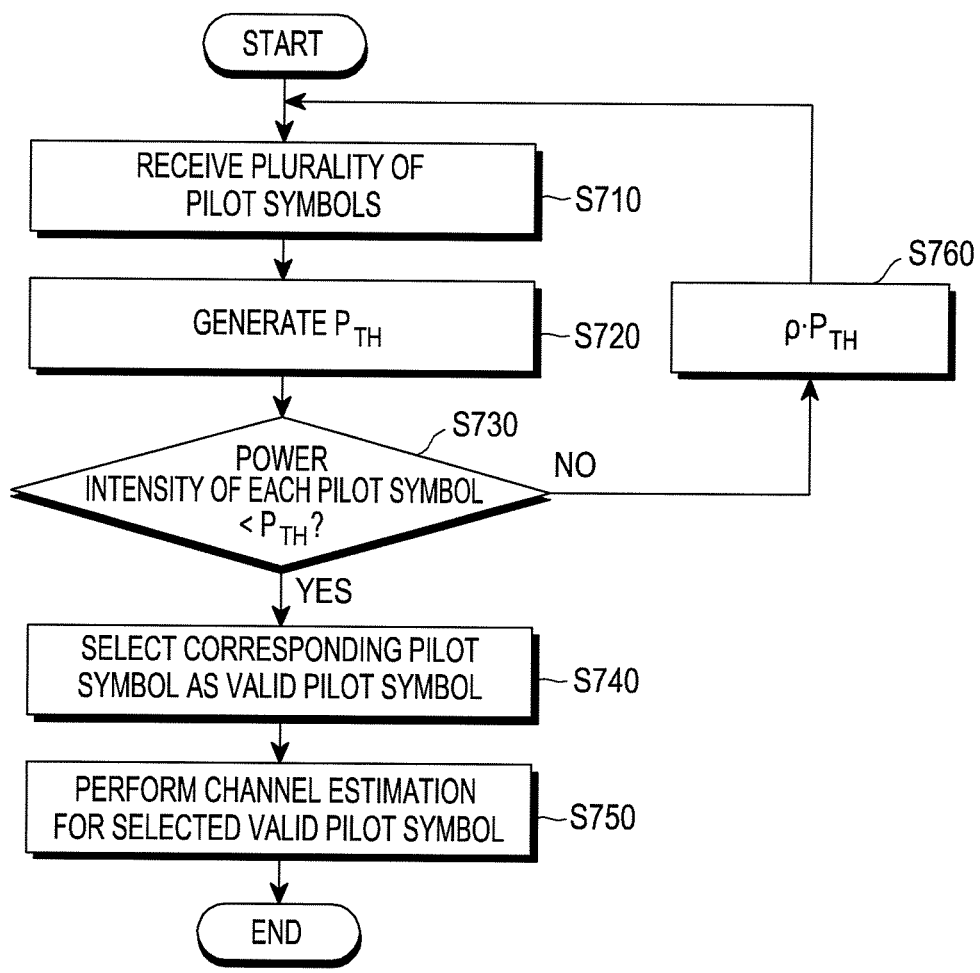
FIG. 7 is a flowchart illustrating a method of estimating a channel in a communication system according to an embodiment of the present disclosure.

FIG. 7 is a flowchart illustrating a method of estimating a channel in the communication system according to an embodiment of the present disclosure. For easy understanding of description, it is assumed that the channel estimation method according to an embodiment of the present disclosure is performed by a terminal that communicates with a base station.

Referring to FIG. 7, in operation S710, a terminal may receive a plurality of pilot symbols transmitted from a base station for channel estimation.

In operation S720, the terminal may generate a reference value $P_{TH}$ using a parameter $N_P$ related to a non-Gaussian characteristic of an inter-cell interference signal, in order to select one or more valid pilot symbols from among the plurality of received pilot symbols.

A process of generating the reference value $P_{TH}$ may include operations of: estimating the non-Gaussian characteristic of the inter-cell interference signal; predicting the probability of collision between the inter-cell interference signal and the plurality of pilot symbols based on the estimated non-Gaussian characteristic; setting the parameter $N_P$ according to the predicted probability of collision; and generating the reference value $P_{TH}$ using the parameter $N_P$.

The reference value $P_{TH}$ may be generated using the parameter $N_P$ for selecting valid pilot symbols and power values of the plurality of received pilot symbols.

The process of generating the reference value $P_{TH}$ may include operations of: generating a first reference value by multiplying the parameter $N_P$ by an average power value $P_{avg}$ of the plurality of pilot symbols; generating a second reference value by multiplying the parameter $N_P$ by a minimum power value $P_{min}$ of the power values of the plurality of pilot symbols; and generating a third reference value by multiplying the parameter $N_P$ by a difference value ($P_{max}-P_{min}$) between a maximum power value $P_{max}$ and the minimum power value $P_{min}$ of the power values of the plurality of pilot symbols.

Operation of generating the first reference value may be preferably used in a system environment where the number of damaged pilot symbols is equal to or similar to the number of non-damaged pilot symbols, and operation of generating the second reference value and operation of generating the third reference value may be preferably used in a system environment where the number of damaged pilot symbols is greatly different from the number of non-damaged pilot symbols.

In operation S730, the terminal may perform a process of selecting valid pilot symbols from among the plurality of received pilot symbols, based on the reference value $P_{TH}$ generated according to the corresponding system environment. That is, if the terminal determines that a power value of a received pilot symbol is smaller than the reference value $P_{TH}$, the terminal may proceed to operation S740 to select the corresponding pilot symbol as a valid pilot symbol. Then, in operation S750, the terminal may perform channel estimation for the selected valid pilot symbol. Meanwhile, if the terminal determines in operation S730 that the power value of the received pilot symbol is equal to or greater than the reference value $P_{TH}$, the terminal may determine that the corresponding pilot symbol is a significantly damaged pilot symbol, and may not select the pilot symbol as a valid pilot symbol. If the terminal determines that a power value of a received pilot symbol is equal to or greater than the reference value $P_{TH}$, the terminal may proceed to operation S760 to increase the reference value $P_{TH}$ generated in operation S720 by a predetermined weight value ρ. Then, the terminal may repeat a series of operations S710 to S750.

As such, according to the present disclosure, by performing channel estimation using only pilot symbols relatively lightly damaged among received pilot symbols in a non-Gaussian interference environment, a channel estimation method capable of ensuring excellent performance can be provided.

Hereinafter, a method of adaptively estimating a channel through cooperation between a base station and a terminal by informing, when the base station provides RB allocation information to the terminal, a channel estimation method suitable for the corresponding RB will be described in detail.

In order to adaptively estimate a channel through cooperation between a base station and a terminal, according to an embodiment of the present disclosure, the base station may recommend a channel estimation method suitable for the terminal between two channel estimation methods. Herein, the two channel estimation methods may include a first channel estimation method using all pilot symbols in RBs, and a second channel estimation method using non-damaged pilot symbols in RBs as described above with reference to FIGS. 2 to 7. The base station may recommend one of the first and second channel estimation methods, and the terminal may perform channel estimation according to the channel estimation method recommended by the base station.

Figure 8:
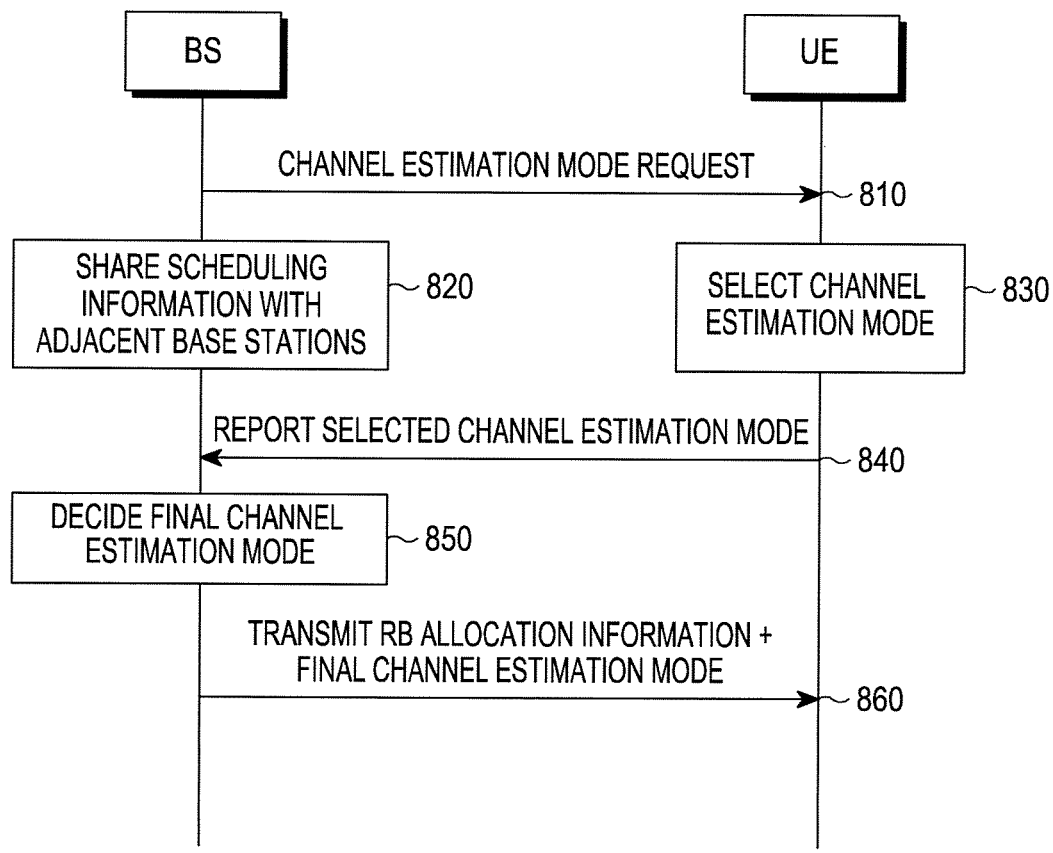
FIG. 8 is a signal flowchart illustrating a procedure of adaptively estimating a channel through cooperation between a base station and a terminal in a communication system according to an embodiment of the present disclosure.

FIG. 8 is a signal flowchart illustrating a procedure of adaptively estimating a channel through cooperation between a base station and a terminal in the communication system according to an embodiment of the present disclosure.

Referring to FIG. 8, in operation 810, a base station BS may request a terminal UE to recommend a channel estimation mode that is most suitable for the terminal UE. The channel estimation mode that is most suitable for the terminal UE means a channel estimation method that is most suitable for the terminal UE in consideration of a fading channel and an inter-cell interference signal characteristic in a current communication environment. That is, in operation 810, the base station BS may request the terminal UE to report the result of determination by itself. At this time, the base station BS may request the terminal UE to report a channel estimation mode according to one of four reporting modes as follows.

Reporting Mode 1 (RM1): mode in which the base station BS requests the terminal UE to report channel estimation that is suitable for each of RBs existing over the entire bandwidth Reporting Mode 2 (RM2): mode in which the base station BS requests the terminal UE to report representative channel estimation for RBs existing over the entire bandwidth.

Reporting Mode 3 (RM3): mode in which the base station BS requests the terminal UE to report channel estimation that is suitable for each of RBs allocated to the terminal UE.

Reporting Mode 4 (RM4): mode in which the base station BS requests the terminal UE to report a representative channel estimation mode for RBs allocated to the terminal UE.

The reason why the base station BS classifies reporting modes for the terminal UE is to appropriately adjust reporting information that the base station BS requests the terminal UE to send, according to the states of the terminal UE and the system, in order to efficiently use resources for control signals or pilot symbols.

An application example for each reporting mode is as follows. When a resource for control signals that the terminal UE can use is sufficient, the base station BS may preferably request the terminal UE to report an appropriate channel estimation mode in RM1 or RM3. That is, the base station BS may preferably request the terminal UE to report a channel estimation mode that is suitable for each RB. However, when a resource for control signals that the terminal UE can use is insufficient, the base station BS may preferably request the terminal UE to report an appropriate channel estimation mode in RM2 or RM4. That is, the base station BS may preferably request the terminal UE to report a representative channel estimation mode for RBs existing over the entire bandwidth.

In system in which RBs that are allocated to the terminal UE change frequently, the base station BS may preferably request the terminal UE to report in RM1 or RM2. That is, the base station BS may preferably request the terminal UE to report a channel estimation mode for each of RBs existing over the entire bandwidth. Meanwhile, in system in which RBs that are allocated to the terminal UE little change, the base station BS may preferably request the terminal UE to report in RM3 or RM4. That is, the base station BS may preferably request the terminal UE to report a channel estimation mode for RBs allocated to itself.

After the base station BS requests the terminal UE to report a channel estimation mode, the base station BS may decide next scheduling, and then transmit/receive information of a difference between current scheduling information related to current scheduling and next scheduling information related to the next scheduling to/from adjacent base stations to thereby share the difference information with the adjacent base stations, in operation 820. Herein, information related to scheduling may include information related to the use or non-use of RBs and/or information related to a modulation method.

In operation 830, the terminal UE may select a channel estimation mode most suitable for itself based on the channel estimation mode request from the base station BS. In order to select a channel estimation mode most suitable for itself, the terminal UE may estimate information $K_{ICI}$ related to a non-Gaussian characteristic of an inter-cell interference signal, information $K_{SINR}$ related to a Signal to Interference-plus-Noise Ratio (SINR), information $K_{FS}$ related to frequency selectivity of a fading channel, and the like, for each RB. The information $K_{ICI}$ may be estimated from a statistics parameter $\alpha$ used in a Complex Generalized Gaussian (CGG) probability density function (pdf), a non-Gaussian characteristic of an adjacent cell interference signal, and the like, and the information $K_{FS}$ may be estimated from variance of an estimated fading channel coefficient. A process of estimating the information $K_{ICI}$ will be described, later.

In operation 840, the terminal UE may report the channel estimation mode selected to be most suitable for itself in operation 830, to the base station BS.

In operation 850, the base station BS may decide a channel estimation mode that is most suitable for the terminal UE, in consideration of information related to the channel estimation mode reported from the terminal UE and the scheduling difference information (that is, the information related to the difference between the current scheduling information and the next scheduling information) shared with the adjacent base stations in operation 820. Hereinafter, in order to distinguish the most suitable channel estimation mode decided by the base station BS from the most suitable channel estimation mode decided by the terminal UE, the most suitable channel estimation mode decided by the base station BS will be referred to as a final channel estimation mode. The base station BS may decide a final channel estimation mode for each RB. When the base station BS recommends the final channel estimation mode for a plurality of terminals, the base station BS may decide the final channel estimation mode for each terminal.

In operation 860, the base station BS may transmit RB allocation information and the final channel estimation mode corresponding to the RB to the terminal UE.

As described above, the information $K_{ICI}$ may be estimated from the statistics parameter $\alpha$ used in the CGG probability density function and the non-Gaussian characteristic of the adjacent cell interference signal. A representative one of existing non-Gaussian models for reference signals may be a CGG model.

The CGG model was designed under the assumption that interference signals or noise follows CGG distribution. The probability density function of CGG distribution used in the CGG model may be expressed as Equation (14), below.

$$f_{\tilde{Z}}(z \mid \alpha, \beta) = \frac{\alpha}{2\pi\beta^2 \Gamma\left(\frac{2}{\alpha}\right)} \exp\left(-\left(\frac{|z|}{\beta}\right)^\alpha\right) \quad (14)$$

In Equation (14), alpha $\alpha$ is a shape parameter, and represents non-Gaussianity of the probability density function. For example, if $\alpha$ is 2, the probability density function is Gaussian, if $\alpha$ is smaller than 2, the probability density function is sub Gaussian whose tail is heavy, and if $\alpha$ is greater than 2, the probability density function is sub Gaussian whose tail is light. Most of inference signals and noise may be modeled as super Gaussian or Gaussian since $\alpha$ is equal to or smaller than 2. The non-Gaussianity may be interpreted as a degree of closeness to super Gaussian, and in this case, the smaller $\alpha$ than 2, the greater non-Gaussianity.

Beta $\beta$ is a scale parameter, and represents variance of the Gaussian probability density function. Probability density functions used in a non-Gaussian decoding method have statistics parameters, such as $\alpha$ and $\beta$, of CGG distribution. Therefore, although the present disclosure is described using the example of the CGG model, the present disclosure can be applied to any method using existing non-Gaussian models.

In the CGG probability density function, a method of estimating the value $\alpha$ may be expressed as Equation (15), below.

$$\alpha = \frac{\ln(3^6 / 2^{10})}{\ln\left(\frac{(E[|J_l[k]|])^2}{E[|J_l[k]|^2]} - \frac{\pi}{4} + \frac{9}{2^{3.5}}\right) + \ln\left(\frac{3}{2\sqrt{2}}\right)}, \quad (15)$$

where $$J_l[k] = Y_l[k] - \hat{H}_l[k]\hat{s}[k]\delta_{l,\hat{m}[k]}.$$

In Equation (15), $Y_l[k]$ represents a signal received through the first one of subcarriers configuring a k-th reception symbol, $\hat{H}_l[k]$ represents a channel coefficient estimated for the first one of the subcarriers configuring the k-th reception symbol, $\hat{s}[k]$ represents a QAM transmission symbol estimated by performing hard decision on the k-th reception symbol, and $\hat{m}[k]$ represents a FSK transmission symbol estimated by performing hard decision on the k-th reception symbol. As such, in order to estimate $\alpha$ in the CGG probability density function, it is necessary to perform hard decision on a reception signal, and a process of the hard decision may be expressed as Equation (16), below.

$$(\hat{m}[k], \hat{s}[k]) = \underset{(m_j[k], s_i[k]) \in C}{\operatorname{argmin}} \sum_{l=1}^{M_F} |Y_l[k] - \hat{H}_l[k]s_i[k]\delta_{m_j[k],l}|^2 \quad (16)$$

In Equation (16), C means a group of FQAM symbols, and the FQAM symbols that are elements of C may be expressed by indexes (FSK symbols) $m_j[k]$ of activated subcarriers and QAM symbols $s_i[k]$ transmitted from the corresponding subcarriers.

Hereinafter, a process in which the terminal UE selects the channel estimation mode most suitable for itself using the estimated information $K_{ICI}$, $K_{SINR}$, and $K_{FS}$ in operation 830 will be described in more detail.

The terminal UE may select a channel estimation mode from among existing channel estimation modes, that is, a mode of estimating a channel using all pilot symbols inserted in a RB allocated by the base station BS, or a mode of estimating a channel using selected valid pilot symbols according to an embodiment of the present disclosure. For convenience of description, the mode of estimating a channel using all pilot symbols will be referred to as a first channel estimation mode, and the mode of estimating a channel using selected valid pilot symbols will be referred to as a second channel estimation mode.

The first channel estimation mode may be selected when at least one of the following first, second, and third conditions is satisfied. The first condition is when a $K_{ICI}$ value is greater than a $G_{th}$ value, wherein $G_{th}$ is a threshold value for determining whether a statistics characteristic of an inter-cell interference signal is Gaussian or non-Gaussian. The second condition is when the $K_{ICI}$ value is smaller than the $G_{th}$ value, and a $K_{SINR}$ value is greater than a $S_{th}$ value, wherein $S_{th}$ is a threshold value for determining whether SINR is high or low. The third condition is when the $K_{ICI}$ value is smaller than the $G_{th}$ value, and the $K_{SINR}$ value is smaller than the $S_{th}$ value, and a $K_{FS}$ value is greater than a $F_{th}$ value, wherein $F_{th}$ is a threshold value for determining whether frequency selectivity is great or smaller.

The second channel estimation mode may be selected when the $K_{ICI}$ value is smaller than the $G_{th}$ value, the $K_{SINR}$ value is smaller than the $S_{th}$ value, and the $K_{FS}$ value is smaller than the $F_{th}$ value. When the second channel estimation mode is selected, a method of selecting valid pilot symbols may use any one of the processes of selecting pilot symbols according to the magnitude of the $G_{th}$ value, as described above with reference to FIGS. 3 to 5.

More specifically, a method according to the process of selecting pilot symbols, as described above with reference to FIGS. 4 and 5, can be appropriately applied to the case in which the number of significantly damaged pilot symbols is very small. That is, the method can be appropriately applied to the case in which a non-Gaussian characteristic of an inter-cell interference signal is very great. Accordingly, when the $G_{th}$ value is smaller than a reference value $Q_{TH}$, the method of selecting pilot symbols, as described above with reference to FIGS. 4 and 5, may be selected.

The process described above with reference to FIG. 3 may correspond to the case in which the number of pilot symbols significantly damaged by an inter-cell interference signal is similar to the number of pilot symbols relatively lightly damaged by the inter-cell interference signal. That is, the process may correspond to the case in which a non-Gaussian characteristic of an inter-cell interference signal is relatively small, compared to the method of selecting pilot symbols, as described above with reference to FIGS. 4 and 5. Accordingly, when the $G_{th}$ value is greater than the reference value $Q_{TH}$, the method of selecting pilot symbols, as described above with reference to FIG. 3, can be preferably selected. The $G_{th}$, $S_{th}$, $F_{th}$, and $Q_{TH}$ values may be decided by link level simulation according to a given system model, and may be set to various values according to how the system model is implemented.

Hereinafter, a process in which the base station BS decides the final channel estimation mode in operation 850 will be described in more detail.

The base station BS may finally decide a channel estimation mode of the corresponding RB, using information related to the channel estimation mode reported from the terminal UE and the scheduling difference information shared with the adjacent base stations. At this time, the base station BS may finally decide a channel estimation mode that is different from the channel estimation mode reported from the terminal UE. The base station BS and the adjacent base stations may exchange information about whether their RBs were occupied and information about whether modulation methods changed, with each other.

The following Table 1 shows various examples in which the base station BS decides a final estimation mode when the base station BS is reported the first channel estimation mode for estimating a channel using all pilot symbols from the terminal UE and when the base station BS is reported the second channel estimation mode for estimating a channel using selected valid pilot symbols.

TABLE 1

| Information reported by Terminal | Sharing Information between Base Station and Adjacent Base Stations (Information Related to Difference between Current Scheduling Information and Next Scheduling Information) | | Final Decision of Base Station |
|---|---|---|---|
| | Use of RB | Modulation Method | |
| Use All Pilot Symbols | Unchanged | Unchanged | Use All Pilot Symbols |
| Use All Pilot Symbols | Unchanged | FQAM→QAM | Use All Pilot Symbols |
| Use All Pilot Symbols | Unchanged | QAM→FQAM | Use Selected Valid Pilot Symbols |
| Use All Pilot Symbols | Used→Unused | | Use All Pilot Symbols |
| Use All Pilot Symbols | Unused→Used | QAM | Use All Pilot Symbols |
| Use All Pilot Symbols | Unused→Used | FQAM | Use Selected Valid Pilot Symbols |
| Use All Pilot Symbols (If Selected Because of Frequency Selectivity) | | | Use All Pilot Symbols (If Selected Because of Frequency Selectivity) |
| Use Selected Valid Pilot Symbols | Unchanged | Unchanged | Use Selected Valid Pilot Symbols |
| Use Selected Valid Pilot Symbols | Unchanged | QAM→FQAM | Use Selected Valid Pilot Symbols |
| Use Selected Valid Pilot Symbols | Unchanged | FQAM→QAM | Use All Pilot Symbols |
| Use Selected Valid Pilot Symbols | Used→Unused | | Use All Pilot Symbols |
| Use Selected Valid Pilot Symbols | Unused→Used | QAM | Use All Pilot Symbols |
| Use Selected Valid Pilot Symbols | Unused→Used | QAM | Use Selected Valid Pilot Symbols |

If the base station BS recommends the second channel estimation mode for estimating a channel using selected valid pilot symbols for the terminal UE although the base station BS is reported the first channel estimation mode for estimating a channel using all pilot symbols from the terminal UE, the terminal UE may perform channel estimation based on the second channel estimation mode according to the recommendation from the base station BS. In this case, the terminal UE may preferably select valid pilot symbols based on the reference value $P_{TH}$ having the meaning of an average value according to the pilot selection method as described above with reference to FIG. 3. The reason is because it is impossible to predict a non-Gaussian characteristic of an interference channel by which the terminal UE may be influenced in the next frame.

Meanwhile, the base station BS may use only sharing information with the adjacent base stations to decide a channel estimation mode, and recommend the decided channel estimation mode for the terminal UE. That is, the base station BS may distinguish the first channel estimation mode and the second channel estimation mode from each other, and recommend one of the first and second channel estimation modes for the terminal UE. That is, when the base station BS finally decides the second channel estimation mode, and recommends the second channel estimation mode for the terminal UE, the base station BS may not decide a process of selecting pilot symbols as shown in FIGS. 3 to 5 to recommend the process. The reason is because the base station BS has difficulties in finding a process of selecting pilot symbols using only sharing information with the adjacent base stations.

Figure 9:
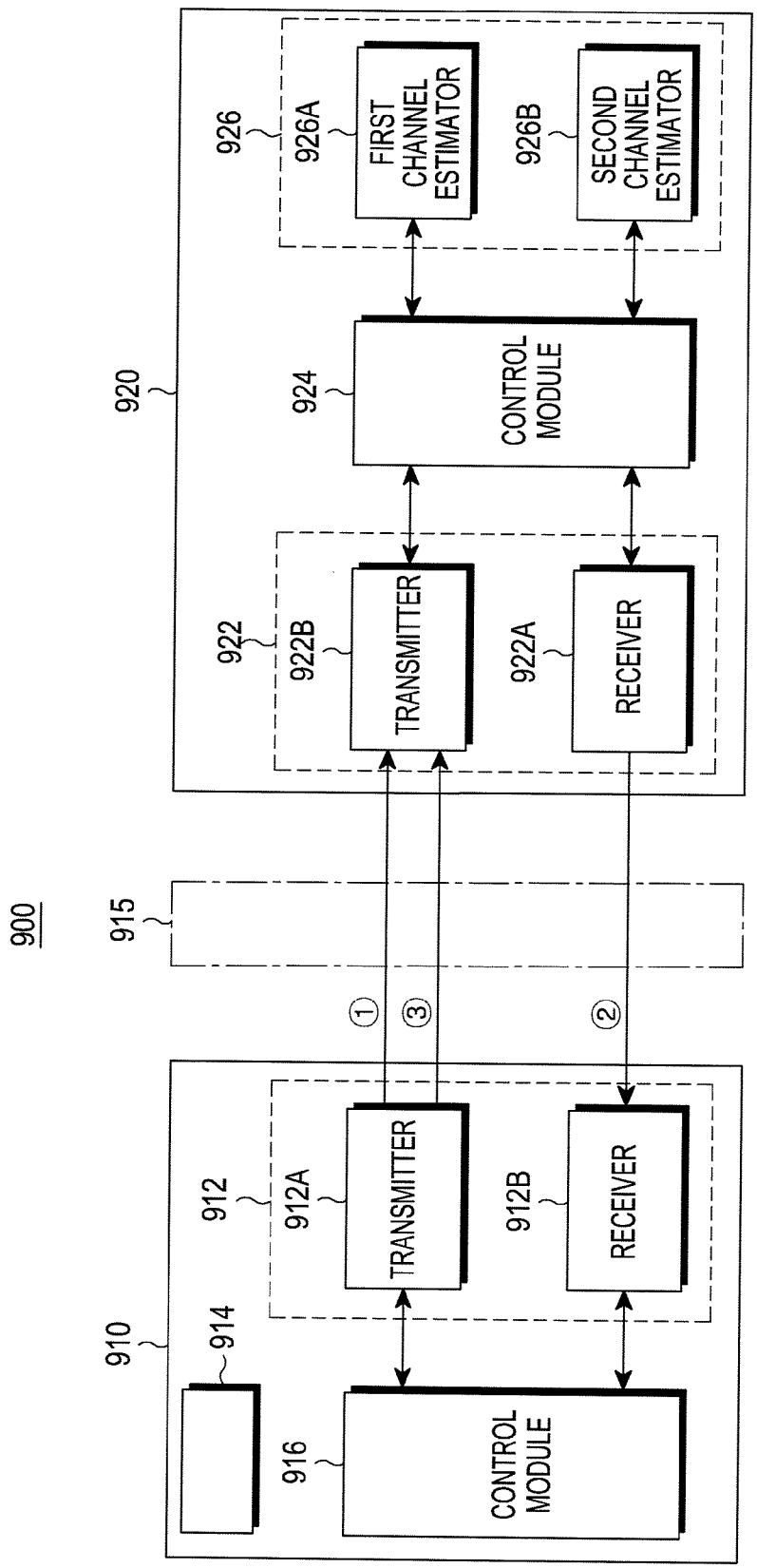
FIG. 9 is a block diagram showing an example of an internal configuration of a base station and a terminal in a communication system according to an embodiment of the present disclosure.

FIG. 9 is a block diagram showing an example of an internal configuration of a base station and a terminal in a communication system according to an embodiment of the present disclosure.

Referring to FIG. 9, it is assumed that a communication system 900 includes a base station 910 and a terminal 920, and the base station 910 communicates with the terminal 920 through a channel 915.

Also, the base station 910 may include a first communication module 912, a second communication module 914, and a control module 916.

The first communication module 912 may have a wireless communication function for enabling wireless communication with the terminal 920, and may include a transmitter 912A and a receiver 912B. The transmitter 912A may transmit a channel estimation mode request ① received from the control module 916 to the terminal 920. The receiver 912B may receive a channel estimation mode ② selected by the terminal 920 according to the channel estimation mode request ①, from the terminal 920, and transfer the channel estimation mode ② to the control module 916.

The second communication module 914 may have a communication function for enabling wired/wireless communication with other base stations (not shown) adjacent to the base station 910, and transfer difference information between current scheduling information and next scheduling information, created by the control module 916, to the adjacent base stations. Also, the second communication module 914 may receive difference information between current scheduling information and next scheduling information, created by the adjacent base stations, and transfer the difference information to the control module 916. That is, the base station 910 may share the difference information between the current scheduling information and the next scheduling information with the adjacent base stations, through the second communication module 914.

The control module 916 may transmit the channel estimation mode request to the terminal 920 through the transmitter 912A, and then create the difference information between the current scheduling information and the next scheduling information. Also, the control module 916 may transmit the created difference information to the adjacent base stations through the second communication module 914, and receive difference information between current scheduling information and next scheduling information, created by the adjacent base stations, from the adjacent base stations.

Also, the control module 916 may finally decide an optimal channel estimation mode using the selected channel estimation mode ② received from the terminal 920 and the difference information shared with the adjacent base stations. The control module 916 may allocate a RB to the terminal 920, and transmit data in the allocated RB, a modulation method and a coding rate used in the allocated RB, position information of the allocated RB, etc., together with the finally decided channel estimation mode ③, to the terminal 920, through the transmitter 912A.

The terminal 920 may include a communication module 922, a control module 924, and a channel estimation module 926.

The communication module 922 may have a wireless communication function for enabling wireless communication with the base station 910, and may include a transmitter 922A and a receiver 922B.

The transmitter 922A may transmit the channel estimation mode ② selected by the control module 924 to the base station 910, in response to the channel estimation mode request ① received through the receiver 922B. The receiver 922B may receive the channel estimation mode ③ finally decided by the base station 910 according to the selected channel estimation mode ②, from the base station 910, and transmit the channel estimation mode ③ to the control module 924.

The control module 924 may control the channel estimation module 926 to perform channel estimation according to the finally decided channel estimation mode ③ received from the base station 910. Herein, the channel estimation mode ③ received from the base station 910 may include any one mode of the first channel estimation mode for estimating a channel using all pilot symbols and the second channel estimation mode for estimating a channel using selected valid pilot symbols. If the received channel estimation mode ③ is the first channel estimation mode, the control module 924 may generate a first mode selection signal, and transfer the first mode selection signal to the channel estimation module 926, and if the received channel estimation mode ③ is the second channel estimation mode, the control module 924 may generate a second mode selection signal, and transfer the second mode selection signal to the channel estimation module 926.

The channel estimation module 926 may include a first channel estimator 926A to estimate a channel according to the first channel estimation mode, and a second channel estimator 926B to estimate a channel according to the second channel estimation mode. Also, the channel estimation module 926 may receive the first mode selection signal or the second mode selection signal from the control module 924, and estimate a channel for pilot symbols in the first channel estimation mode or the second channel estimation mode. For example, if the channel estimation module 926 receives the first mode selection signal from the control module 924, the first channel estimator 926A may perform channel estimation using all pilot symbols, and if the channel estimation module 926 receives the second mode selection signal from the control module 924, the second channel estimator 926B may select valid pilot symbols relatively lightly damaged by an interference signal, and estimate a channel for the selected valid pilot symbols. The process of selecting the valid pilot symbols relatively lightly damaged by the reference signal and the process of estimating the channel using the selected valid pilot symbols have been sufficiently described above with reference to FIGS. 2 to 7, and accordingly, detailed descriptions thereof will be omitted.

The internal components of the terminal 920 of FIG. 9 may be blocks divided, for easy understanding of description, to correspond to functions. Operations that are performed by the channel estimation module 926 and the control module 924 may be implemented in the form of an algorithm, and the algorithm may be installed in the control module 924. In this case, the channel estimation module 926 included in the terminal 920 of FIG. 9 may be omitted.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method to estimate a channel by a terminal in a wireless communication system, the method comprising:
generating a reference value based on power values of the received pilot symbols and a parameter value determined based on an estimation result of at least one interference signal for received pilot symbols;
comparing the reference value to each of the power values of the received pilot symbols;
selecting at least one pilot symbol among the received pilot symbols based on a result of the comparison; and
estimating a channel using the at least one selected pilot symbol.

2. The method of claim 1, wherein the parameter value is adjusted based on frequency selectivity of a fading channel, and the frequency selectivity is estimated from a variance of a fading channel coefficient.

3. The method of claim 1, wherein generating the reference value comprises:
calculating an average power value for the power values of the received pilot symbols; and
generating the reference value by multiplying the parameter value by the average power value.

4. The method of claim 1, wherein generating the reference value comprises:
selecting a minimum power value that is a minimum value of the power values of the received pilot symbols; and
generating the reference value by multiplying the parameter value by the minimum power value.

5. The method of claim 1, wherein generating the reference value comprises:
selecting a minimum power value that is a minimum value of the power values of the received pilot symbols and a maximum power value that is a maximum value of the power values of the received pilot symbols; and
generating the reference value by multiplying the parameter value by a difference value between the maximum power value and the minimum power value.

6. A terminal in a wireless communication system, the terminal comprising:
a receiver configured to receive pilot symbols; and
a processor configured to:
generate a reference value based on power values of the received pilot symbols and a parameter value determined based on an estimation result of at least one interference signal for the received pilot symbols,
compare the reference value to each of the power values of the received pilot symbols,
select at least one pilot symbol among the received pilot symbols, and
estimate a channel using the at least one selected pilot symbol.

7. The terminal of claim 6, wherein the parameter value is adjusted based on frequency selectivity of a fading channel, and the frequency selectivity is estimated from a variance of a fading channel coefficient.

8. The terminal of claim 6, wherein the processor is configured to:
calculate an average power value for the power values of the received pilot symbols, and
generate the reference value by multiplying the parameter value by the average power value.

9. The terminal of claim 6, wherein the processor is configured to:
select a minimum power value that is a minimum value of the power values of the received pilot symbols, and
generate the reference value by multiplying the parameter value by the minimum power value.

10. The terminal of claim 6, wherein the processor is configured to:
select a minimum power value that is a minimum value of the power values of the received pilot symbols and a maximum power value that is a maximum value of the power values of the received pilot symbols, and
generate the reference value by multiplying the parameter value by a difference value between the maximum power value and the minimum power value.

11. The method of claim 1, wherein the parameter value is determined based on a non-Gaussianity of the at least one interference signal identified based on the estimation result.

12. The method of claim 11, wherein the parameter value is determined as a first value if the non-Gaussianity is smaller than a predetermined value.

13. The method of claim 12, wherein the parameter value is determined to be greater or smaller than the first value based on a collision probability, if the non-Gaussianity is greater than or equal to the predetermined value, and
wherein the collision probability is determined based on the estimation result of the at least one interference signal and information about subcarriers included in each of the received pilot symbols.

14. The terminal of claim 6, wherein the parameter value is determined based on a non-Gaussianity of the at least one interference signal identified based on the estimation result.

15. The terminal of claim 6, wherein the parameter value is determined as a first value if the non-Gaussianity is smaller than a predetermined value.

16. The terminal of claim 15, wherein the parameter value is determined to be greater or smaller than the first value based on a collision probability, if the non-Gaussianity is greater than or equal to the predetermined value, and
wherein the collision probability is determined based on the estimation result of the at least one interference signal and information about subcarriers included in each of the received pilot symbols.

* * * * *